United States Patent
Meschkat

(10) Patent No.: US 9,361,288 B2
(45) Date of Patent: Jun. 7, 2016

(54) PROCESSING TEMPLATES USING SEPARATE TEMPLATE PROCESSING INSTRUCTIONS

(71) Applicant: Google Inc., Mountain View, CA (US)

(72) Inventor: Steffen Gerd Meschkat, Zürich (CH)

(73) Assignee: Google Inc., Mountain View, CA (US)

(*) Notice: Subject to any disclaimer, the term of this patent is extended or adjusted under 35 U.S.C. 154(b) by 378 days.

(21) Appl. No.: 13/963,999

(22) Filed: Aug. 9, 2013

(65) Prior Publication Data

US 2015/0169534 A1    Jun. 18, 2015

(51) Int. Cl.
*G06F 17/22* (2006.01)
*G06F 17/24* (2006.01)

(52) U.S. Cl.
CPC .......... *G06F 17/248* (2013.01); *G06F 17/2247* (2013.01); *G06F 17/241* (2013.01)

(58) Field of Classification Search
CPC ....... G06F 17/248; G06F 8/74; G06F 17/218; G06F 17/2247; G06F 17/241
See application file for complete search history.

(56) References Cited

U.S. PATENT DOCUMENTS

| | | | |
|---|---|---|---|
| 8,615,707 B2* | 12/2013 | Fortuna | G06F 17/30864 715/200 |
| 9,021,348 B1* | 4/2015 | Meschkat | G06F 17/212 715/235 |
| 9,141,356 B2* | 9/2015 | Braude | G06F 9/45504 |
| 9,152,619 B2* | 10/2015 | Meschkat | G06F 17/248 |
| 2006/0173863 A1* | 8/2006 | Paulus | H04L 67/02 |
| 2008/0320441 A1* | 12/2008 | Ahadian | G06F 8/24 717/108 |
| 2009/0024986 A1* | 1/2009 | Meijer | G06F 8/437 717/137 |
| 2010/0185934 A1* | 7/2010 | Fortuna | G06F 17/30864 715/234 |
| 2010/0306738 A1* | 12/2010 | Verma | G06F 17/30893 717/115 |
| 2013/0054284 A1* | 2/2013 | Burke | G06Q 10/00 705/7.11 |
| 2015/0169534 A1* | 6/2015 | Meschkat | G06F 17/248 715/234 |

* cited by examiner

*Primary Examiner* — Maikhanh Nguyen
(74) *Attorney, Agent, or Firm* — Dority & Manning, P.A.

(57) ABSTRACT

A system and method for processing templates using separate template processing instructions is disclosed. Two separate encapsulated sets of instructions are provided for operations upon a template. A separate first encapsulated set of processing instructions merges the template with first data set stored at a first computing device and the separate second encapsulated set of instructions merges the template with second data set stored at a second computing device. The first encapsulated set of instructions are executed at the first computing device to update the template with the first data set, and then deleted. The updated template and the second encapsulated set of instructions are then provided to the second computing device for execution of the second encapsulated set of instructions at the second computing device to update the template with the second data set.

14 Claims, 5 Drawing Sheets

PROCESSING TEMPLATES USING SEPARATE TEMPLATE PROCESSING INSTRUCTIONS

The present application is related to U.S. patent application Ser. No. 13/461,866 entitled "System and Method for Processing Markup Language Templates from Partial Input Data," filed on May 2, 2012, the disclosure of which is hereby incorporated by reference in its entirety for all purposes.

BACKGROUND

The present disclosure relates generally to document processing and more particularly, to techniques for template processing using partial input data to generate web documents, such as Hypertext Markup Language (HTML) documents. Web pages, HTML, and other web-based documents may be dynamically constructed using template processing. Template processing generally includes merging a data set (e.g., a collection of data elements) with a structured template to produce a document. The data set is merged with the template by processing instructions embedded within the template. The processing instructions may be operational to bind the data set to the template, or to facilitate binding of the data set to the template. In various aspects, template processing may be implemented by a web server to generate a web page for a client device, or implemented within a web browser on the client device. In the later scenario, the template is provided to the web browser and merged with a locally stored data set to produce the document at the client device.

SUMMARY

The subject technology provides a system and method for processing templates using separate template processing instructions. According to one aspect, a computer-implemented method may comprise providing a template and a separate collection of processing instructions for the template, the processing instructions including first instructions for merging the template with first data set stored at a first computing device and including second instructions for merging the template with second data set stored at a second computing device, executing the first instructions at the first computing device to update the template with the first data set, updating the processing instructions to exclude the first instructions, and providing the updated template and the updated processing instructions to the second computing device for execution of the second instructions at the second computing device to update the template with the second data set. Other aspects include corresponding systems, apparatus, and computer program products for implementation of the computer implemented method.

In another aspect, a computer program product comprising instructions stored in a tangible computer-readable storage medium. In this aspect, the instructions may comprise instructions for receiving a template and a separate first set of processing instructions for merging the template with a first data set stored at a first computing device and a separate second set of instructions for merging the template with a second data set stored at a second computing device, instructions for executing the first set of instructions at the first computing device to update the template with the first data set, instructions for deleting the first instructions, and instructions for providing the updated template and the second set of instructions to the second computing device for execution of the second set of instructions at the second computing device to update the template with the second data set. Other aspects include corresponding systems, methods, apparatus, and computer program products for implementation of the computer implemented method.

In a further aspect, a system may include a system computing device, and a memory. The system computing device may be configured to receive a template and a separate collection of processing instructions for the template, the processing instructions including first instructions for merging the template with first data set stored in the memory and including second instructions for merging the template with second data set stored at a remote computing device, execute the first instructions to update the template with the first data set, update the processing instructions to exclude the first instructions, and provide the updated template and the updated processing instructions to the remote computing device for execution of the second instructions at the remote computing device to update the template with the second data set.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
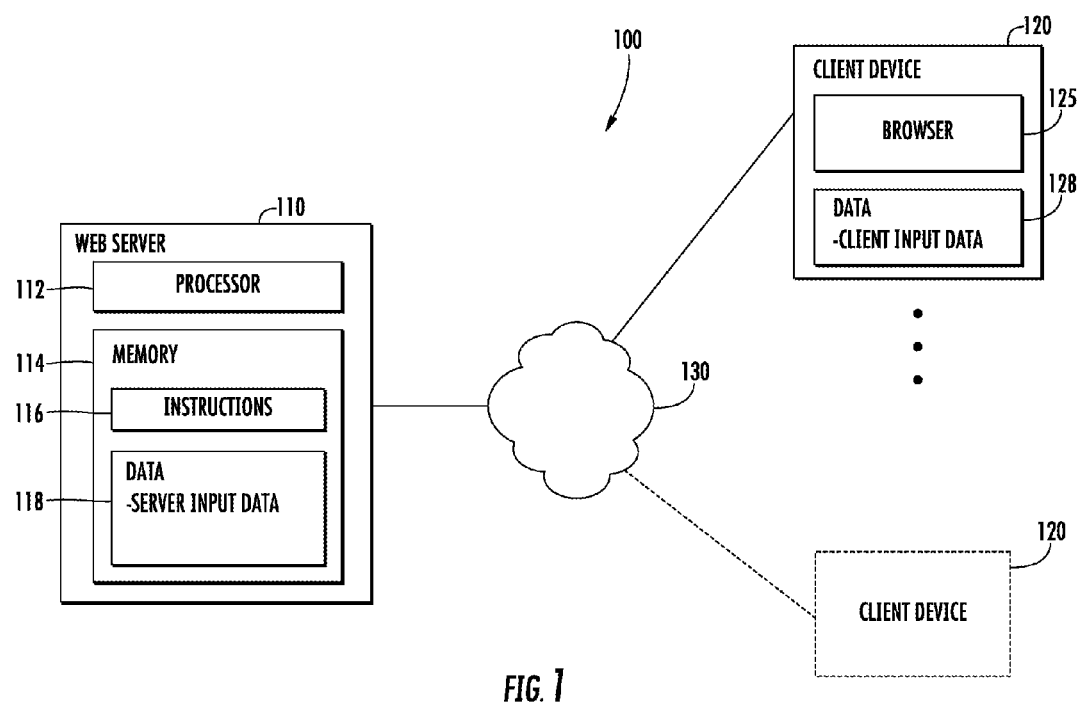
FIG. 1 depicts an example computing environment.

Developments in template processing have allowed for template processing at both the server and the client device and for dynamic shifting between template processing at the server and at the client device. For example, a first version of the input data may be processed at the server to generate an HTML document that is sent to the client device. The generated HTML document may also serve as a template available for processing at the client device. As new input data become available at the client device, the client device may process the HTML document (which also acts as a template) to generate an updated HTML document.

In certain cases, a template may be dependent on multiple different input data that are not available in the same location. For example, some of the input data may be available only at the server. Other input data may be available only at the client device. Other input data may be available at both the server and the client device. The input data available at the client device may have a different data structure type than input data available at the server.

Techniques for processing templates that are dependent on input data available in different locations include processing separate templates at the server and at the browser. Alternatively, the same template may be processed at the server and the browser, but the same input data needs to be supplied at both locations. Data that is not available, such as data available only on a client device, may be replaced by dummy data during template processing at the server. The template with the dummy data may then be sent to client device for reprocessing based on input data that become available at the client device.

The subject technology provides a mechanism for processing a document template at multiple devices using a collection of separate and/or independent processing instructions that are passed from device to device in connection with the template, or as part of a separate process. In this regard, the collection of processing instructions are arranged so as to correspond to the layout of the template to be processed so that each device receiving the processing instructions may use the instructions to process the template. The collection is encapsulated within an instruction object or document independent of the template. A device receiving the template identifies the corresponding instruction object or document for the received template and executes the instructions therein to process the template.

The collection of processing instructions includes multiple sets of instructions, with each set for processing the template on a respective computing device. A first set of instructions may be arranged to, when executed, bind the template with a corresponding data set stored on a first computing device to generate an updated template. Similarly, a second set of instructions may be arranged to, when executed, bind the updated template with a corresponding second data set stored on a second computing device to generate a second updated template or final client document, and so on.

Following execution of a respective set of instructions, the executed set may be removed from the collection of processing instructions. In this manner, the overall data footprint of the processing instructions decreases in size as the template is reprocessed on subsequent computing devices. For example, a first set of instructions in a collection of processing instructions may be executed at a first computing device to update the document template with a first data set stored at the first computing device. The first set of instructions may then be excluded (e.g., removed or inactivated) from the collection, and the collection forwarded with the updated document template to a second computing device. A second set of instructions in the collection may then be executed at the second device to generate a document (e.g., a web page) or another updated template. The reduced data footprint of the collection facilitates faster downloading time and a more efficient processing by the second device.

FIG. 1 depicts an example computing environment 100, according to some aspects of the subject technology. Example computing environment 100 may include any number of computing systems that include one or more computing devices having any suitable computational ability. A computing device may include, for example, a desktop computer, notebook, tablet, smart phone, augmented reality glasses, or other display device having a computer embedded therein or attached thereto. Any of the foregoing example computing devices may be configured to function as a "server" or "client device." In the depicted example, computing environment 100 includes a server 110 and one or more client devices 120 connected over a network 130. One of client devices 120 is depicted in dashed line to indicate that any number of client devices 120 may be connected to server 110 over network 130.

While FIG. 1 depicts one example of a computing environment 100 that may be used to implement the methods of the present disclosure, using the disclosures provided herein, it is recognized that the flexibility of computer based systems allows for a great variety of possible configurations, combinations, and divisions of tasks and functionality between and among the components. For example, the various computer-implemented methods discussed herein may be implemented using a single server or processor or multiple such elements working in combination. Databases and other memory/media elements and applications may be implemented on a single system or distributed across multiple systems.

Network 130 may include any number of wired or wireless communication links for coupling together computing devices. For example, network 130 may include one or more of a cellular network, WiFi network, LAN, WAN, the Internet, and/or other suitable network. Server 110 may include a network interface to allow communications with the client devices 120 over network 130. Similarly, client device 120 may include a network interface to allow communication with the server 110 over the network 130. The server 110 and the client device 120 may exchange information over the network 130 in any suitable format. For example, the information may include HTML messages or other suitable format.

Server 110 may include any computing device configured to exchange information with the client device 120. In one embodiment, the server 110 may be a web server that may host web pages, web sites, web applications, and/or other server-client applications. Server 110 may include a processor(s) 112 and a memory 114. The processor(s) 112 may be any known processing device, such as a microprocessor, digital signal processor, controller, or other suitable processing device. Memory 114 may include any suitable computer-readable medium or media, including, but not limited to volatile memory, non-volatile memory, RAM, ROM, hard drives, flash drives, magnetic and optical storage devices, or other memory devices.

Memory 114 may store information accessible by processor(s) 112, including computer-readable instructions 116 that may be executed by processor(s) 112. The instructions 116 may be any set of instructions that when executed by processor(s) 112 cause the processor(s) 112 to provide desired functionality, such as any of the template processing techniques disclosed herein. The instructions 116 may be software instructions rendered in a computer-readable form. When software is used, any suitable programming, scripting, or other type of language or combinations of languages may be used to implement the teachings contained herein. Alternatively, the instructions may be implemented by hard-wired logic or other circuitry, including, but not limited to application-specific circuits.

Memory 114 may store data 118 that may be accessed and/or manipulated by processor(s) 112. For example, memory 114 may store server side input data that may be used to generate a document, such as an HTML document for presentation on a browser 125 of a client device 120. The data 118 may be stored in one or more databases. The databases may also be split up so they are in multiple locales. The databases data may be coupled to server 110 through a high bandwidth LAN or WAN or through network 130.

Client device 120 may generally include any node on the network 130 that includes computational ability and that may communicate with server 110. For example, the client device 120 may be a personal computer, smartphone, desktop, laptop, smart device, PDA, tablet, augmented reality glasses, or other computing device. The client device 120 may include a processor and a memory and may include appropriate input and output devices, such as a display screen, touch screen, touch pad, data entry keys, speakers, and/or microphone suitable for voice recognition. The client device 120 may be configured to display information to users through a suitable user interface.

Client device 120 may host a browser 125 which may be any application that may display web documents, such as a web browser. Browser 125 may allow a user to browse and interact with web pages, web sites, web-based applications, and other client-server applications. Client device 120 may also store, receive, generate or access data 128 that may be used by the client device 120. For example, client device 120 may store, receive, generate, or access data that may be used to update or generate a web document, such as an HTML document, for presentation on the browser 125. According to aspects of the present disclosure, the server 110 and the client device 120 may be configured to perform template processing techniques to generate a web document for display on a browser 125 of the client device 120.

Figure 2:
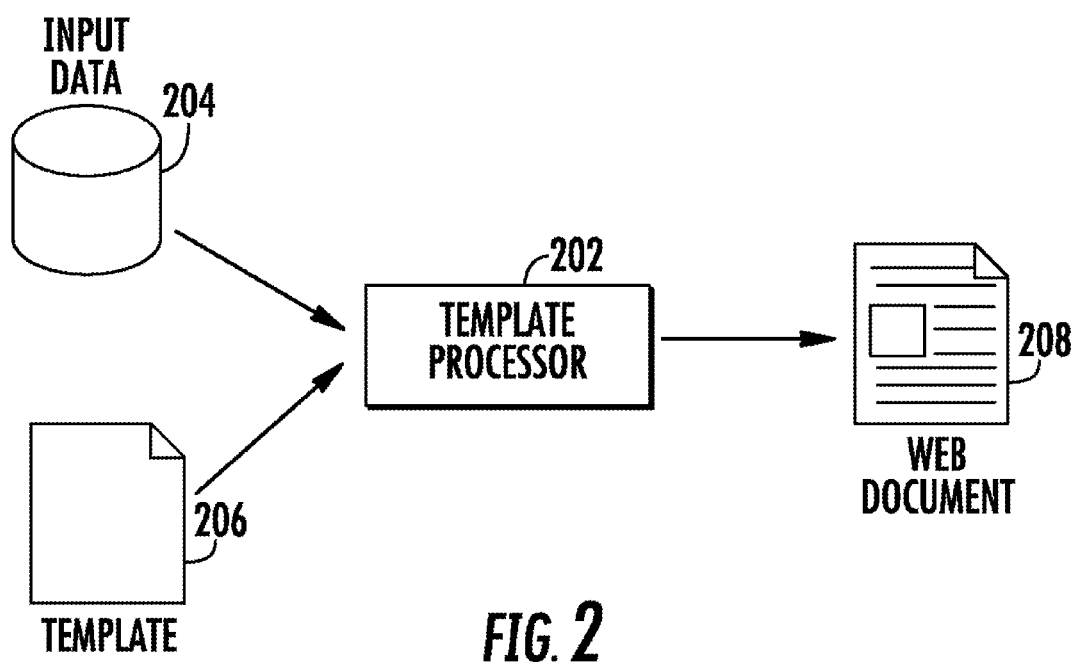
FIG. 2 depicts an example of how template processing may be used to generate a web document.

FIG. 2 depicts an example of how template processing may be used to generate a web document, such as an HTML document. As shown, a template processor 202 may receive input data 204 and a template 206. Template processor 202 may be configured to bind the input data 204 to the template 206 to generate a web document 208.

Input data 204 contains the data that needs to be presented in the web document 208. Input data 204 may be defined in a data structure and may include one or more types of data, such as simple data and/or one or more data objects. The data objects may be specified using a programming language (e.g. JavaScript). As will be discussed in further examples, input data 204 may be available only at server 110 (see FIG. 1) or may be available only at a client device 120. Alternatively, the input data 204 may be available at both the server 110 and the client device 120.

Referring to the example of FIG. 2, template 206 contains layout instructions that specify how to layout the data in the web document 208. For example, the layout instructions may specify fonts, colors, paragraph layout, tables, lists, sections, image locations, image sizes, etc. within the web document 208. The layout instructions may be in any suitable format, such as HTML format.

The template 206 may be processed in connection with template processing instructions that tell the template processor 202 how to bind input data 204 to the template 206. The template processing instructions may include one or more template parameters that refer to elements stored in input data 202. During processing of the template, the template processor 202 may evaluate the template parameter to generate a string or object in the web document 208. The template-processing instructions may involve simple variable substitution or may be relatively complex. In general, template-processing instructions may be as powerful as general purpose programming instructions. As will be discussed further, the subject technology is configured to use a collection of separate and independent template processing instructions that are passed from device to device in connection with the template, or as part of a separate process.

Figure 3:
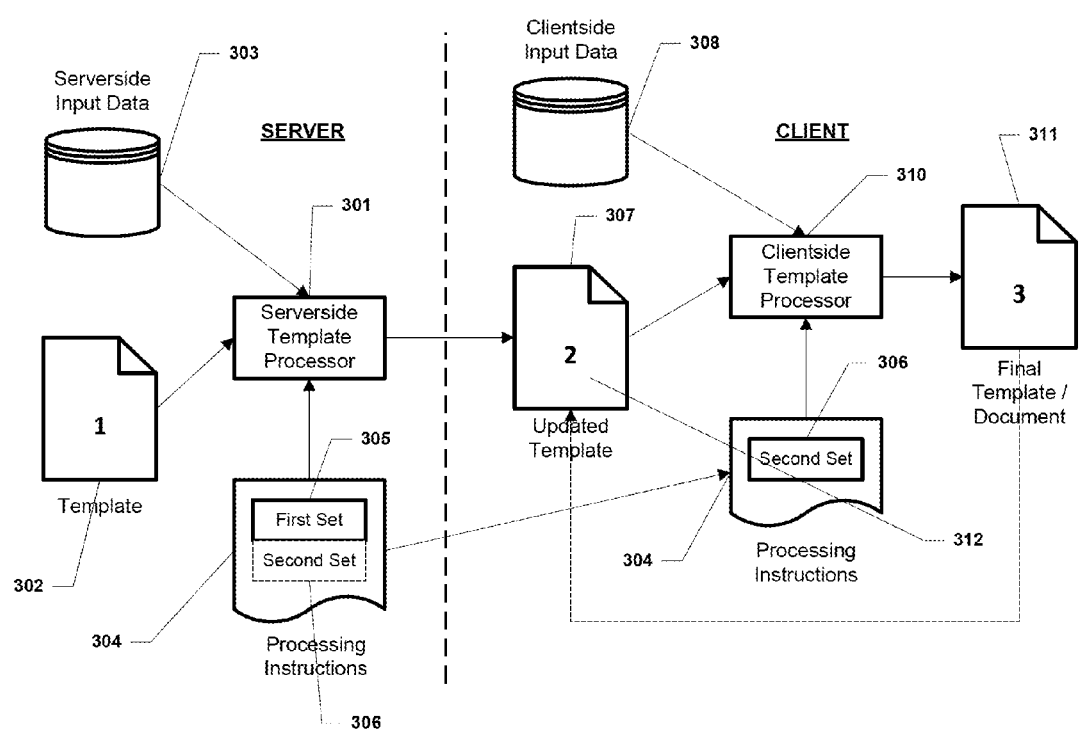
FIG. 3 depicts an example of how template processing may occur at both a server and a client device.

FIG. 3 depicts an example of how template processing may occur at both a server 110 and a client device 120, according to exemplary aspects of the present disclosure. In particular, a server-side template processor 301 receives a first template 302, a server-side input data set 303, and a collection of template-processing instructions 304. Template processor 301 may be implemented as software or a software component that uses template-processing instructions 304 to combine template 302 with a data set 303 to produce one or more result documents. As will be discussed below, template-processing instructions 304 are provided to template processor 301 as a unit (e.g., document, code base, or compiled code) separate from first template 302 and server-side input data set 303, and specify how to bind input data set 303 to template 302.

The collection of template-processing instructions 304 may be, for example, represented by a data structure. The data structure may be implemented in XML (extensible markup language) syntax or other markup language, or programming construct such as an object-oriented class. The data structure may be compiled (e.g., as Java bytecode), or written as an interpreted programming language or scripting language (e.g., Javascript). In this regard, processing instructions 304 may be transported in and executed from a stand-alone document, unit of codebase, or compiled code.

Template-processing instructions 304 are organized to include multiple sets of instructions, with each set for processing the template on a respective computing device. In the depicted example, template-processing instructions 304 include a first set of instructions 305 for merging (e.g., binding) template 302 with first input data set 303 stored at server 110, and include a second set of instructions 306 for merging template 302 with a second input data set 307 stored at client device 120. While only two data sets are depicted, it is recognized that template-processing instructions 304 may be a collection of three, four, or more sets of instructions, each for merging a version of template 302 with a data set at a respective computing device.

Each set of instructions may be a separate data structure, and may be implemented independent of each other. For example, template-processing instructions 304 may include a collection of files, documents, and/or data structures that each include a respective set of instructions. Accordingly, first instructions 305 may be encapsulated within a first single code base unit, and the second instructions may be encapsulated within a second single code base unit. In one example, template-processing instructions 304 is a collection of java objects, including a first java object that comprises first instructions 305, and a second java object that comprises second instructions 306. The java objects may be interpreted class objects or compiled into bytecode.

In some implementations, the processing of certain of the template-processing instructions may depend on template parameters associated with a respective input data set. For example, template 302 may include (e.g., embedded therein) annotations indicating where to find template-processing instructions for processing certain portions of the template. In one aspect, template 302 may include one or more data fields (or sections) annotated with the location of first instructions 305, and one or more other data fields (or sections) annotated with the location of second instructions 306. The locations may be a file location or name or identification of a data structure that implements the instructions. In some aspects, template 302 may include annotations indicating that first instructions 305 are available for execution at server 110, and that second instructions 306 are available for execution at client device 120. The annotations may further indicate the type of data structure for the instructions. For example, one or more annotations may indicate that a data structure type of instructions 305 and 306 is a java-compatible data structure.

Server-side template processor 301 uses first instructions 305 to process first template 302 and generate a second template 307 from server-side input data 303 and first template 302. For example, processor 301 may access the location of template-processing instructions 304, and determine the set of instructions to execute that correspond to a currently processed portion of the template. The instructions may then be loaded and executed by template processor 301 to process template 302. Once second template 307 is generated, second template 307 may then be provided to client device 120 over a network via a network interface.

In various aspects, second template 307 may be both a template and a valid web document for display at the client device 120. In particular, the web document/template 307 may include a plurality of components that were not evaluated at the server 110. In this regard, certain sections of second template 307 may have been left unchanged from before corresponding template 302 was processed on server 110. As described previously, a collection of processing instructions 304 includes instructions for multiple input data sets, which may be located on different computing devices. A first set of instructions 305 may correspond to a first input data set 303, and a second set of instructions 306 may correspond to a second input data set 308, and so on. Each set of instructions may be annotated with the location of a corresponding input data set, so that a template processor, when parsing the instructions, may determine where from to load the input data set to be processed.

In some aspects, each set of instructions may include an annotation to identify a device on which the input set of data should be processed. In this manner, the corresponding data sets may be transmitted from device to device with each update to the template, and the appropriate data set merged with a template on the appropriate device designated by the annotation. In some aspects, processing instructions 304 and the input data sets 303 and 308 may be transmitted from device to device, and respective annotations in the current template being processed may determine which set of instructions to use in processing the template, and upon which data set to operate.

In the depicted example, after first template 302 is processed by server-side template processor 301, processor 301 deletes first instructions 305 (indicated by dashed lines) from template-processing instructions 304 and transmits 309 the updated collection which now includes second instructions 306 to client device 101, together with second template 307. In some implementations, template-processing instructions 305 may instruct template processor 301 to provide second instructions 306 as custom HTML attributes in the web document 307. In this regard, second template 307 may be transmitted with second instructions 306 embedded therein.

Second instructions 306 specify binding instructions for browser-side input data 308 to the web document/template 307. A browser-side template processor 310 may then receive or access the browser-side input data 308 and update or modify the web document/template 307 with browser-side input data 308 pursuant to second instructions 306, in the manner described previously with respect to server-side template processor 301. Second instructions 306 are made available at client device 120 so that they do not interfere with the display of the web document/template 308 at the client device 120.

Accordingly, a third, final template/document 311 is generated based on the execution of second instructions 306 to merge client-side input data set 308 with second template 307. For the purpose of this disclosure the terms "merge" and "bind" are used synonymously. The processing may then be repeated 312 using respective input data sets and processing instructions to generate further updates to template 311 or to create new templates. The new or updated templates may then be transmitted to other computing devices in the previously described manner.

To facilitate template processing based on input data available at different locations, such as server-side input data 304 and browser-side input data 312, first template 302 may include annotations associated with template parameters that are indicative of the availability of input data for the template parameters. As an example, first template 302 may include a first annotation type, such as a server-only annotation, that indicates that input data associated with a template parameter is available only at the server. Additionally or in the alternative, first template 302 may include a second annotation type, such as a browser-only annotation, that indicates that input data associated with a template parameter is available only at the client device.

Server-side template processor 301 may identify which template-processing instructions to evaluate based at least in part on the annotations in the first template 302. For example, server-side template processor 301 may identify template parameters that depend on input data set 303 available at the server based on the annotations. Server-side template processor 301 may evaluate the template parameters that depend on server-side input data 303. The remaining template-processing instructions in collection 304 remain for processing by the browser-side template processor 310, and so on.

Figure 4:
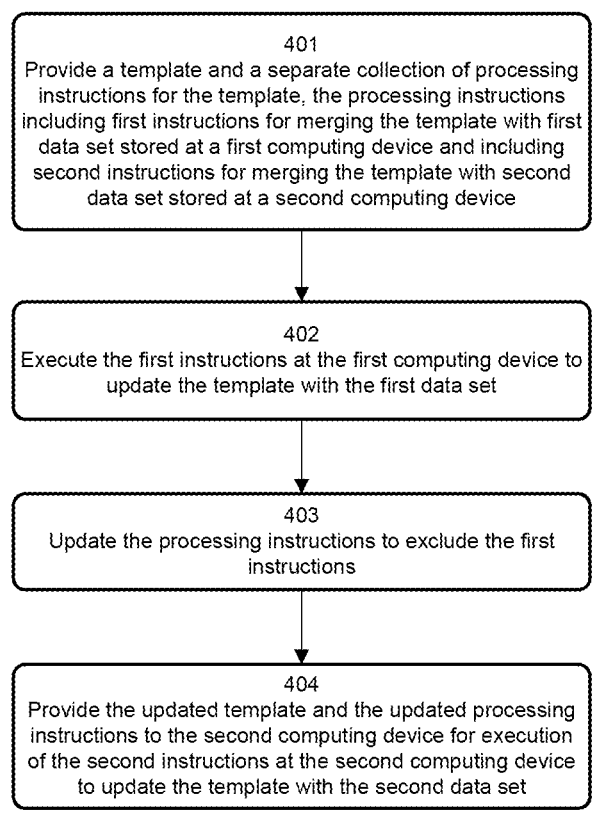
FIG. 4 is a flowchart illustrating an example a process for processing templates using separate template processing instructions.

FIG. 4 is a flowchart illustrating an example a process for processing templates using separate template processing instructions. The blocks of FIG. 4 do not need to be performed in the order shown. It is understood that the depicted order is an illustration of one or more example approaches, and are not meant to be limited to the specific order or hierarchy presented. The blocks may be rearranged, and/or two or more of the blocks may be performed simultaneously.

According to one or more implementations, one or more blocks of FIG. 4 may be executed by server 110 or client device 120, or other computing device of the subject technology. Similarly, a non-transitory machine-readable medium may include machine-executable instructions thereon that, when executed by a computer or machine, perform the blocks of FIG. 4. Accordingly, the blocks of FIG. 4 may be performed within the context of processing templates using a template parser or other template processor.

In block 401, a template and a separate collection of processing instructions for the template are provided. As the example of FIG. 3, the processing instructions of block 401 include first instructions for merging the template with first data set stored at a first computing device and including second instructions for merging the template with second data set stored at a second computing device.

In various implementations, the first and second instructions are separate and independent units of code. For example, the first instructions may be encapsulated within a first unit of code, and the second instructions are encapsulated within a second unit of code. In one example, the collection of processing instructions are encapsulated in a data structure (e.g., a java data structure) having embedded therein a first representation of a class object (e.g., a java or C++ class) that comprises the first instructions, and a second representation of a class object that comprises the second instructions.

The template to be processed may include one or more annotations may indicate that the first instructions are available for execution at the first computing device, and that the second instructions are available for execution at the second computing device. The one or more annotations may further indicate a data structure type of the processing instructions. In one example, the data structure type is a java-compatible data structure. Similarly, one or more annotations may indicate that the first data set is available at the first computing device, and that the second data set is available at the second computing device.

In block 402, the first instructions at the first computing device are executed to update the template with the first data set. In various implementations, the updated template may be a HTML (Hypertext Markup Language) document generated by server-side template processor 301. Accordingly, the updated template may be passed from device to device over an HTTP-based communication.

In block 403, the processing instructions are updated to exclude the first instructions. In this regard, the first instructions may be deleted from the collection of processing instructions, or designated as inactive within the collection of processing instructions so that the first instructions are not executed by the second computing device.

In block 404, the updated template and the updated processing instructions are provided to the second computing device for execution of the second instructions at the second computing device to update the template with the second data set. In various aspects, the updated template and the updated processing instructions may be provided to the second computing device in different programming languages. For example, providing the updated template and the updated processing instructions to the second computing device may include sending the updated processing instructions to a web browser operating on the second computing device as a browser-compliant document over HTTP (Hypertext Transport Protocol). The updated template may be downloaded by the web browser as an HTML document, and the updated processing instructions downloaded as code or other data (e.g., compiled or non-compiled). In some aspects, the updated template may again be updated using the previously described process, for example, by using a third set of processing instructions and/or a third input data set. The template may be update on the same device or transmitted to a third device and updated at the third device, and so on.

Figure 5:
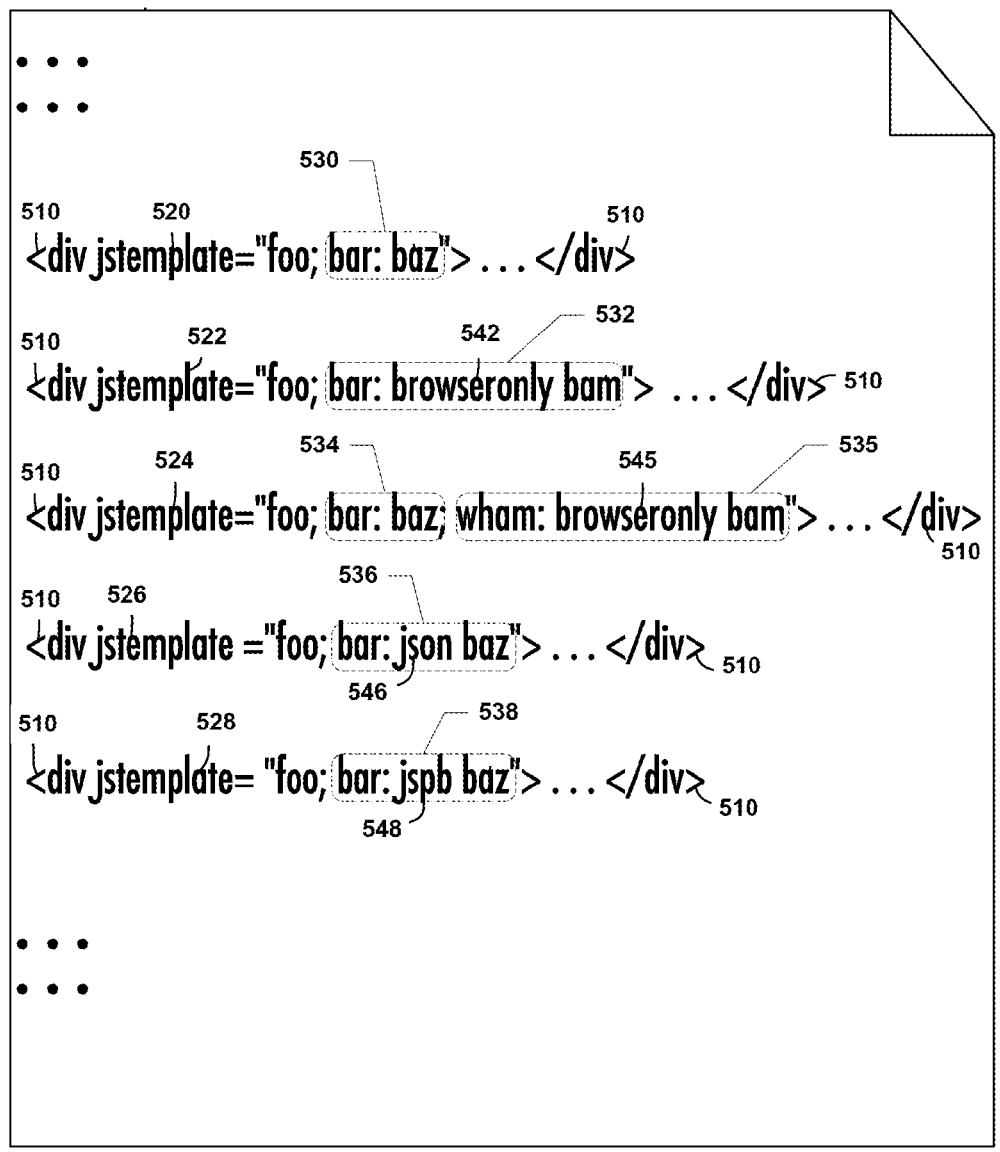
FIG. 5 depicts an example set of template processing instructions as applied to an example template.

FIG. 5 depicts an example set of template processing instructions as applied to an example template, according to some aspects of the subject technology. A document 500 is depicted with reference to example instructions and attributes for exemplary and illustration purposes. Those of ordinary skill in the art, using the disclosures provided herein, should understand that document 500 may include any number of instructions and attributes of varying complexity.

In the depicted example, document 500 includes processing instructions as they could be applied by a template processor to specific layout instructions 510 of a template. Accordingly, a plurality of template processing-instructions 520, 522, 524, 526, and 528 are depicted together with (or merged) with layout instructions 510. However, as described previously, it is understood that template processing-instructions 520, 522, 524, 526, and 528 may be found in a separate document or data structure, and then merged with layout instructions 510 or executed to operate on layout instructions 510 in the same manner.

Layout instructions 510 specify the layout of an example HTML document. In particular, document 500 includes exemplary HTML tags <div> and </div> that divide the HTML document into different sections. Document 500 also includes template processing-instructions 520, 522, 524, 526, and 528, such as the "jstemplate" processing instruction. This exemplary "jstemplate" processing instruction may be used to bind input data from a specified field in a data structure to the document 500.

Each of the example template-processing instructions 520, 522, 524, 526, and 528 is presented in the format "jstemplate=<name of the template>; <parameter name>: <qualifier> <parameter type>. In the depicted example, each instruction is dependent on a template parameter 530, 532, 534, 535, 536 and 538. As will be discussed in more detail below, the template parameters 530, 532, 534, 535, 536 and 538 may be associated with input data available at different locations. Certain of the input data may be available at the server. Certain of the input data may be available at the client device. Other input data may be available at both locations. Similarly, one or more of template-processing instructions 520, 522, 524, 526, and 528 may be located in a first document for execution at a first device, and one or more of template-processing instructions 520, 522, 524, 526, and 528 may be located in a second document for execution at a second device.

To identify the availability of the input data, the document 500 further includes qualifier annotations 542, 545, 546 and 548 that are indicative of the availability of the input data either at the server or at the client device. The annotations may also specify a data structure type of the input data. For example, annotations 546 and 548 specify a data structure type of the input data. During processing of document 500, a template processor may identify a file that includes template-processing instructions for execution on the corresponding device, to evaluate the data structure type of the input data at a given location (e.g. server or client device) based on the annotations.

For example, document 500 includes a first processing instruction 520 that is dependent on a first template parameter 530. First template parameter 530 is associated with an element in an input data structure. No annotation is associated with the first template parameter 530 in document 500. The default rule for template parameters with no annotation may be that the template parameter is associated with input data available only at the device where the template is processed. Accordingly, first template parameter 530 may be determined to be associated with input data available at server 110. Alternatively, an annotation such as "server-only" (not shown) may be associated with first template parameter 530 to indicate that the input data associated with first template parameter 530 is available at the server. During template processing of document 500 at the server, first template parameter 530 will be evaluated based on the input data associated with template parameter 530.

Document 500 also includes a second template-processing instruction 522 that is dependent on a second template parameter 532. A "browser-only" annotation 542 is associated with second template parameter 532. The "browser-only" annotation indicates that second template parameter 532 should not be evaluated at the server. Rather, the second template parameter 532 should be sent to the client device for evaluation. As shown, the second template-processing instruction 522 may be embedded in the document 500 as a custom HTML attribute. As a result, second template-processing instruction 522 does not interfere with the display of document 500 as a web document at the client device.

According to particular aspects of the present disclosure, document 500 may also include a third template-processing instruction 524. Template-processing instruction 524 is dependent on two template parameters 534 and 535. The template parameter 534 has no associated annotation indicating that it is dependent on input data available at the server. The template parameter 535 has a browser-only annotation 545 indicating that it is dependent on input data available at the client device. During template processing of the document 500 at the server, the template parameter 534 will be evaluated and replaced with a literal value at the server. The template-processing instruction 524 may then be sent to the client device (e.g., without template parameter 534) for further processing, such as evaluation of template parameter 535 based on browser-side input data.

Document 500 may also include annotations that specify a data structure type, such as a javascript data structure type, of the input data at the client device. Exemplary data type annotations may include a "json" annotation or a "jspb" annotation. In one embodiment, the annotation may indicate that the input data is available at the client device in a particular data structure type. During processing of document 500 at the server, the template-processing instruction associated with the data type annotation may be modified to accommodate the data structure type available at the server. The modified template-processing instruction may be evaluated at the client device based on the input data available at the client device.

Alternatively, the data type annotations may indicate that the input data is available in a first data structure type at the server, such as a protocol buffer data structure type, and that the input data is also available in a second data structure type at the client device, such as a javascript data structure type. The template parameters associated with these annotations may be evaluated a first time at the server based on the first data structure type and a second time at the client device based on the second data structure type. The template-processing instruction may be modified during template processing at the server to accommodate the second data structure type available at the client device.

For example, document 500 includes a template-processing instruction 526 that is dependent on a template parameter 536. A "json" annotation 546 is associated with the template parameter 536. The "json" annotation indicates that template parameter 536 may be evaluated at the client device as a JSON (JavaScript Object Notation) object. In this example, template parameter 536 may be passed to the client device unchanged.

Document 500 is also depicted to include a template-processing instruction 528 that is dependent on a template parameter 538. A "Jspb" annotation 548 is associated with the template parameter 538. The "Jspb" annotation indicates that the template parameter 538 may be evaluated at the client device as a JSPB Array. The template-processing instruction 528 may be modified during template processing at the server to accommodate the JSPB Array data type. In particular, the template parameter 538 may be modified from object property access expressions (e.g. "bar.wham") to array element access expressions (e.g. "bar[1]").

In a particular implementation, a template parameter may be associated with both a "browser-only" annotation and a data type annotation, such as a "json" annotation or a "jspb" annotation. In this embodiment, the template parameters are not evaluated at the server, but may be modified to accompany a data structure type, such as a JSPB data structure type, for evaluation at the client device. In another particular implementation, a template parameter may refer to a sub-message of the original template parameter. In this case, the sub-messages may be structured to inherent the annotation associated with any parent template parameter.

Those of skill in the art would appreciate that the various illustrative blocks, modules, elements, components, methods, and algorithms described herein may be implemented as electronic hardware, computer software, or combinations of both. To depict this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for processing templates using separate template processing instructions, the method performed by at least one computer processor, the method comprising:
   providing a template and a separate collection of processing instructions for the template, the processing instructions including first instructions for merging the template with a first data set stored at a first computing device and including second instructions for merging the template with a second data set stored at a second computing device, and wherein the template comprises one or more annotations indicating that the first instructions are available for execution at the first computing device and that the second instructions are available for execution at the second computing device;
   executing the first instructions at the first computing device to update the template with the first data set;
   updating the processing instructions to exclude the first instructions, wherein updating the processing instructions to exclude the first instructions comprises at least one of:
   deleting the first instructions from the collection of processing instructions; and
   designating the first instructions as inactive within the collection of processing instructions so that the first instructions are not executed by the second computing device; and
   providing the updated template and the updated processing instructions to the second computing device for execution of the second instructions at the second computing device to update the updated template with the second data set.

2. The computer-implemented method of claim 1, wherein providing the updated template and the updated processing instructions to the second computing device comprises:
   sending the updated processing instructions to a web browser operating on the second computing device as a browser-compliant document over HTTP (Hypertext Transport Protocol).

3. The computer-implemented method of claim 1, wherein the template comprises one or more annotations indicating that the first data set is available at the first computing device, and that the second data set is available at the second computing device.

4. The computer-implemented method of claim 1, wherein the one or more annotations indicate that a data structure type of the processing instructions is a java-compatible data structure.

5. The computer-implemented method of claim 1, wherein the first instructions are encapsulated within a first unit of code, and the second instructions are encapsulated within a second unit of code.

6. The computer-implemented method of claim 1, wherein the updated template is a HTML (Hypertext Markup Language) document, and the processing instructions are encapsulated in a data structure having embedded therein a first representation of a class object that comprises the first instructions, and a second representation of a class object that comprises the second instructions.

7. The computer-implemented method of claim 6, wherein the updated template and the updated processing instructions are provided to the second computing device in different programming languages.

8. A system, comprising:
   a system computing device; and
   a memory;
   the system computing device being configured to:
     receive a first template and a separate collection of processing instructions for the first template, the processing instructions including first instructions for merging the first template with a first data set stored in the memory and including second instructions for merging the first template with a second data set stored at a remote computing device, and wherein the first template comprises one or more annotations indicating that the first instructions are available for execution at the system computing device and that the second instructions are available for execution at the remote computing device;
     execute the first instructions to generate a second template from the first template and the first data set;
     update the processing instructions to exclude the first instructions, wherein to update the processing instructions to exclude the first instructions, the system computing device is configured to at least one of:
     delete the first instructions from the collection of processing instructions; and
     designate the first instructions as inactive within the collection of processing instructions so that the first instructions are not executed by the remote computing device; and
     provide the second template and the updated processing instructions to the remote computing device for execution of the second instructions at the remote computing device to update the second template with the second data set.

9. The system of claim 8, wherein the system computing device is further configured to:
   send the updated processing instructions to a web browser operating on the remote computing device as a browser-compliant document over HTTP (Hypertext Transport Protocol).

10. The system of claim 1, wherein the one or more annotations indicate that a data structure type of the processing instructions is a java-compatible data structure.

11. The system of claim 8, wherein the first instructions are encapsulated within a first single code base unit, and the second instructions are encapsulated within a second single code base unit.

12. The system of claim 8, wherein the second template is a HTML (Hypertext Markup Language) document.

13. The system of claim 12, wherein the processing instructions comprise compiled code.

14. A computer program product comprising instructions stored in a tangible non-transitory computer-readable storage medium, the instructions comprising:
- instructions for receiving a template and a separate first set of processing instructions for merging the template with a first data set stored at a first computing device and a separate second set of instructions for merging the template with a second data set stored at a second computing device, and wherein the template comprises one or more annotations that indicate that the first instructions are available for execution at the first computing device and that the second instructions are available for execution at the second computing device;
- instructions for executing the first set of instructions at the first computing device to update the template with the first data set;
- instructions for deleting the first set of processing instructions; and
- instructions for providing the updated template and the second set of instructions to the second computing device for execution of the second set of instructions at the second computing device to update the template with the second data set.

* * * * *